March 23, 1943.  D. R. BOMFORD  2,314,763
MEANS OR MACHINERY FOR CLEARING OR EXCAVATING DITCHES
Filed June 3, 1941  6 Sheets-Sheet 3

Inventor
DOUGLAS RAYMOND BOMFORD
By Norris & Bateman
ATTORNEYS

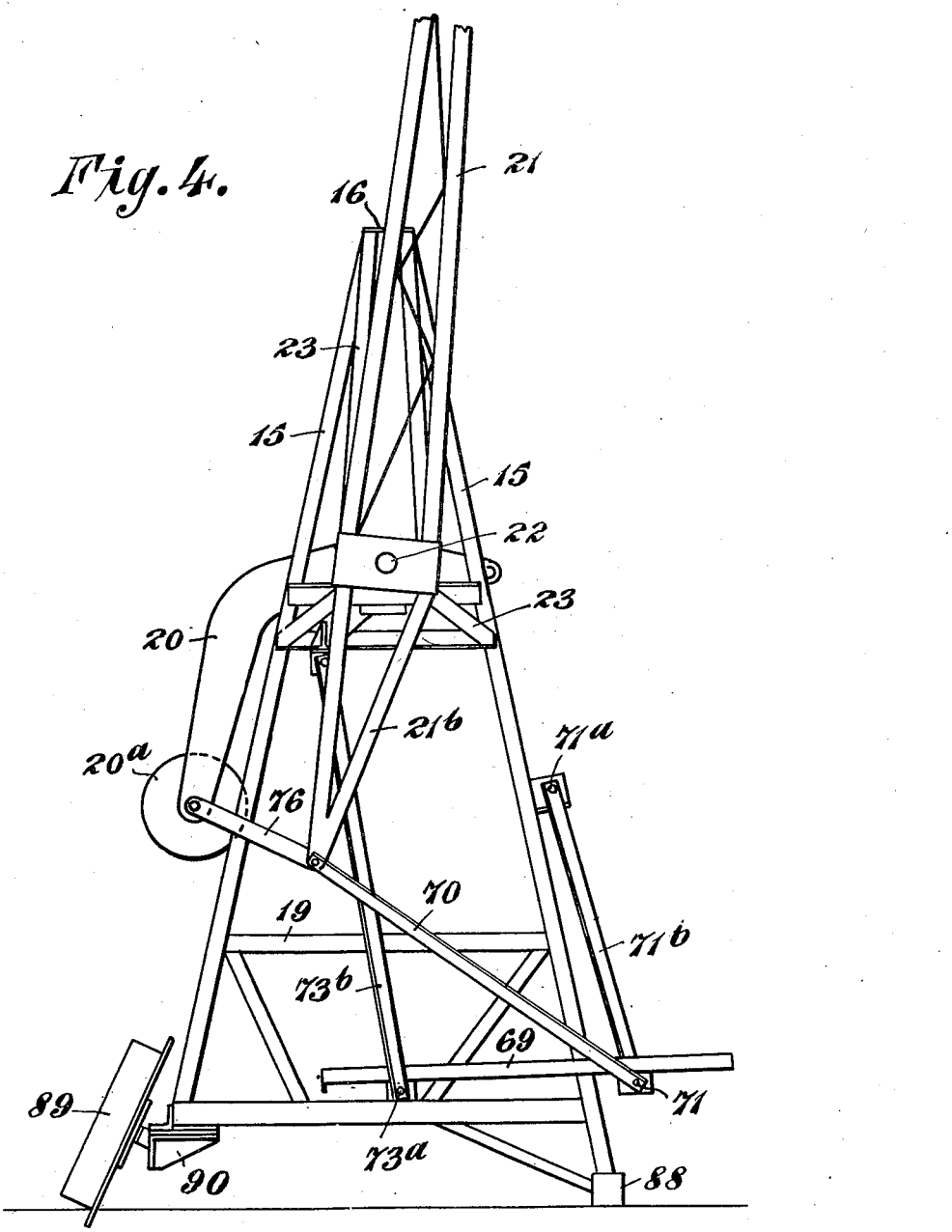

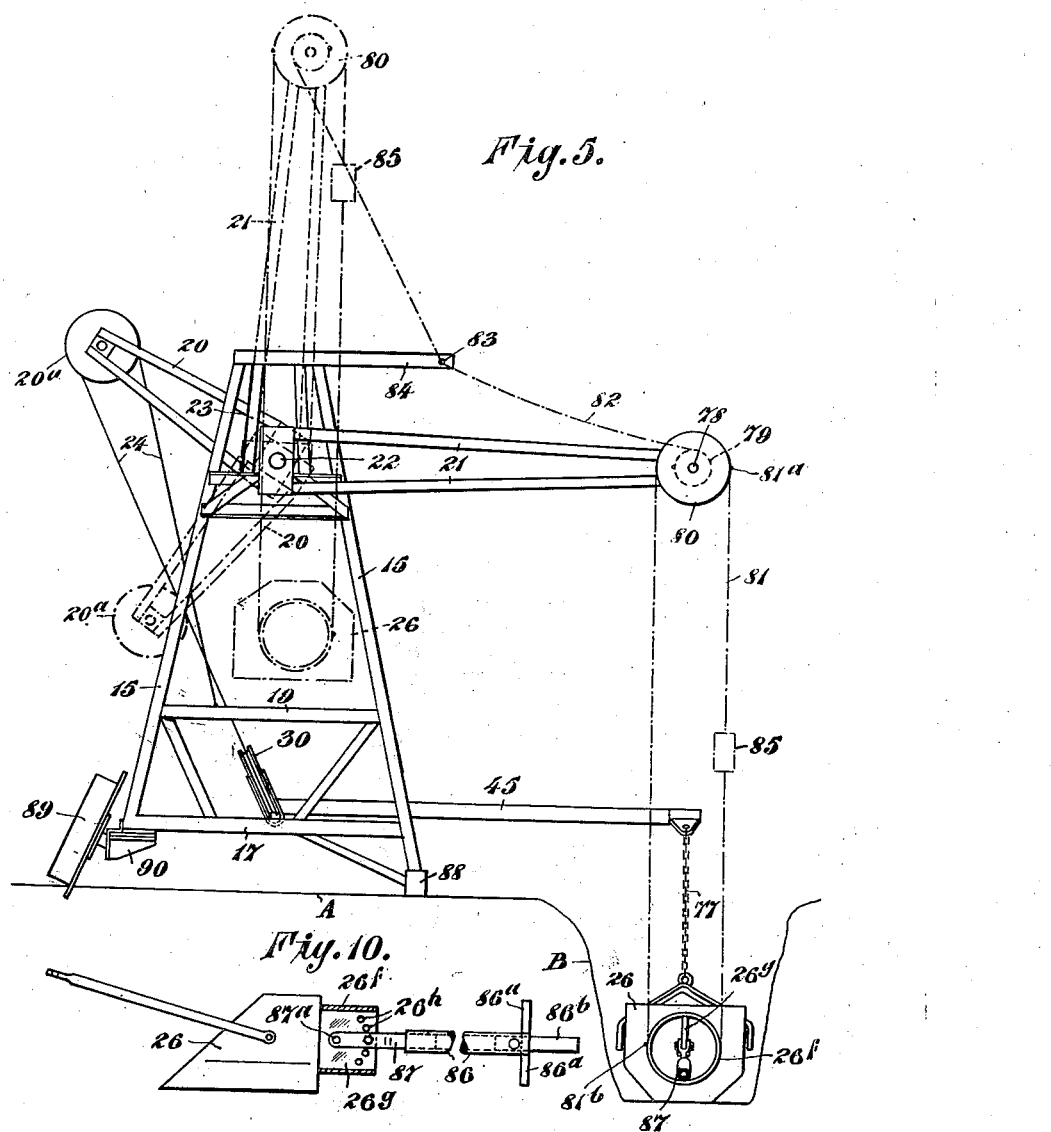

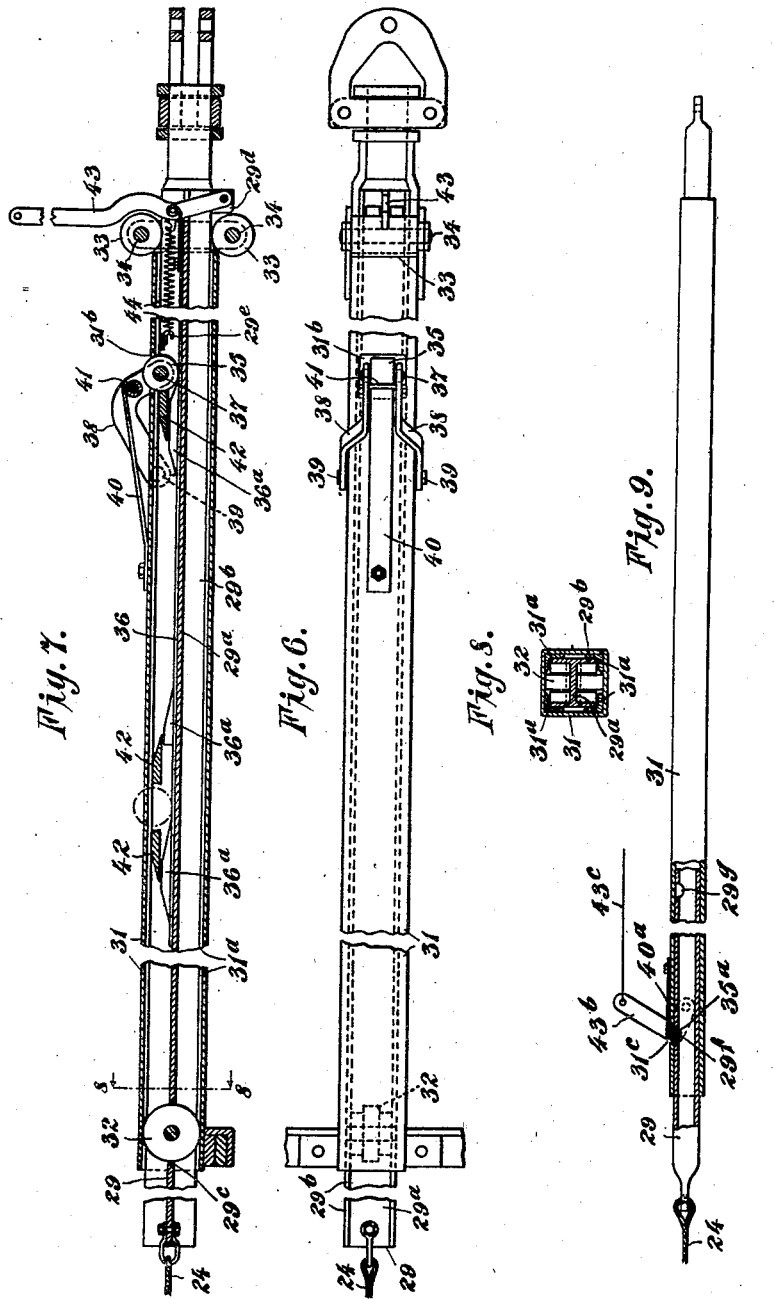
Inventor
DOUGLAS RAYMOND BOMFORD
By Norris & Bateman
ATTORNEYS

Patented Mar. 23, 1943

2,314,763

UNITED STATES PATENT OFFICE 2,314,763

MEANS OR MACHINERY FOR CLEARING OR EXCAVATING DITCHES

Douglas Raymond Bomford, Bevington Hall, near Evesham, England, assignor to Bomford & Evershed Limited, Salford Priors, near Evesham, England Application June 3, 1941, Serial No. 396,444
In Great Britain July 1, 1940

14 Claims. (Cl. 37—103)

This invention has reference to new or improved means or machinery for clearing or excavating ditches such as are customarily provided for the drainage of agricultural land.

The invention has for its object to provide means or machinery for the purposes specified and by the use of which the clearing or excavating operation is facilitated, said machinery being comparatively light in weight and readily adapted to be drawn by a small agricultural tractor or motor and furthermore which can be produced and sold at a cost which can be afforded by persons of moderate means working small farms or estates.

A machine in accordance with the present invention embodies a standard or framing adapted to be traversed by a tractor or motor the said standard or framing supporting means or mechanism, such as is hereinafter described, co-operating with draw bar mechanism to effect the sequential operations hereinafter more particularly referred to on a scoop or bucket provided in conjunction with the machine and whereby the refuse or material to be cleared from the ditch, or the soil which is excavated in the formation of a new ditch is gathered and removed therefrom, and the invention is characterised in that the performance of the operations on the scoop or bucket, in the requisite sequence, is controlled through the medium of a reciprocable member incorporated with the draw-bar with which the machine is furnished, one end of the said reciprocable member being adapted for connection with the tractor or motor and its other end having connection with the aforesaid co-operating means or mechanism mounted on the standard or framing The means or mechanism mounted on the traversible standard or framing and the operation of which is controlled through the medium of the reciprocable member of the draw-bar mechanism is designed to support the scoop or bucket used in conjunction with the machine and whereby the clearing or excavation of material from the trench is effected, to lower the said bucket to its acting position, to raise and give a lateral motion thereto, after it has gathered its load of material to be removed from the trench, to bring it into an inverted position for discharging the load and to restore it to its lowered position for the repetition of the sequence of operations.

The mechanism mounted on the traversable standard or framing may also embody, if desired, a tray-like member whereon the material gathered from the trench or ditch by the bucket and discharged therefrom when the bucket is inverted is deposited, and means whereby the said tray-like member is brought in desired synchrony with the motions of the other parts of the machine into the requisite positions for receiving the material from the inverted bucket and subsequently depositing it well clear of the machine at the side thereof remote from the trench or ditch.

The invention consists in means or machinery for the purpose specified, and characterised in the respect aforesaid, and further in certain details of construction of the parts hereinafter described.

The invention will be further and more particularly described with reference to the accompanying drawings which illustrate a convenient and preferred embodiment of machinery in accordance with the invention and also modifications in the construction of certain of the parts thereof hereinafter referred to.

Figure 1 represents in side elevation a convenient embodiment of machinery in accordance with the invention and showing the parts thereof in the positions which they respectively occupy when the bucket or scoop is lowered to a position for collecting, on the forward traversing of the machine, a load of the earth or rubbish to be removed from the excavation or ditch whereon the machine is performing its operations.

Figure 4 is a rear end view showing certain parts of the machine in the relative positions assumed thereby when the operating arm is turned down to raise the bucket sling arm to the position at which the bucket is to be inverted for discharging its contents, the outer, or upper, end of the bucket sling arm being broken away and the bucket omitted from this view.

Figure 5 is a similar view to Figure 3 illustrating a modified embodiment of machinery in accordance with the invention.

Figure 6 represents in plan, partly broken away for economy of space on the sheet, the reciprocable member and parts associated therewith, and which is incorporated with the draw-bar mechanism with which the machine is furnished for its connection with the tractor or motor whereby the machine is traversed in the performance of its operations.

Figure 7 represents the parts of the draw-bar mechanism shown in Figure 6, partly in side elevation and partly in longitudinal vertical section.

Figure 8 is a transverse section thereof on the plane indicated by the dotted line 8—8 in Figure 7.

Figure 9 represents partly in side elevation and partly in longitudinal section a modification in construction of the said parts of the draw-bar mechanism.

Figure 10 represents partly in side elevation and partly in section the scoop or bucket and parts associated therewith, shown in conjunction with the modified embodiment of the machine illustrated in Figure 5.

Figure 3:
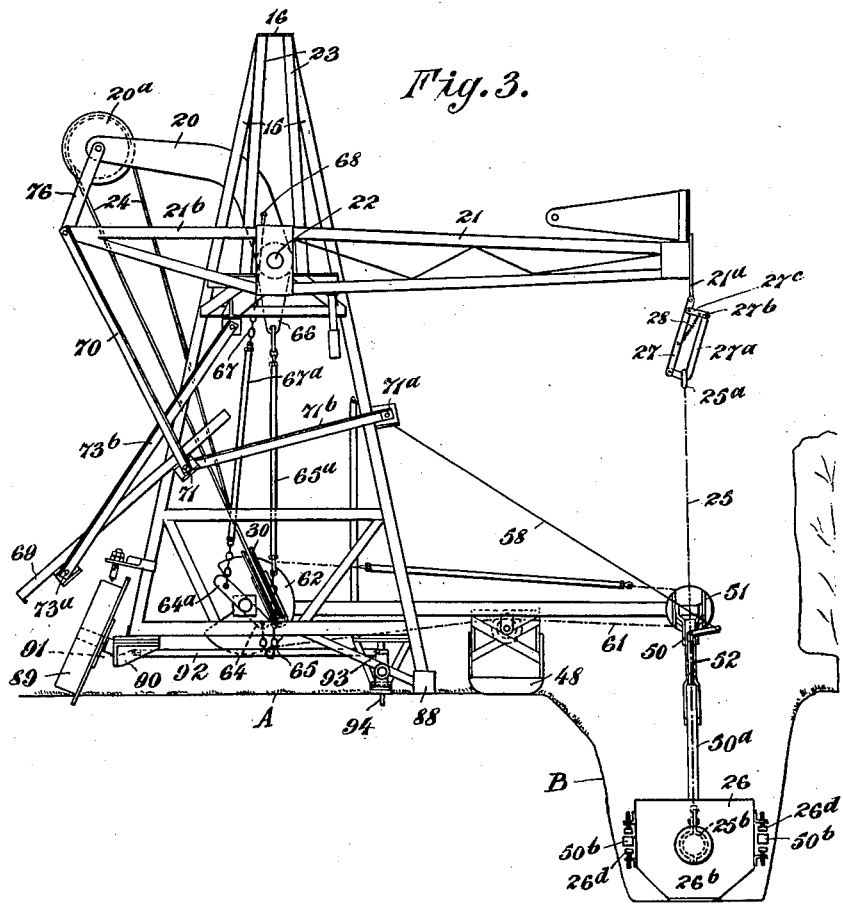
Figure 3 is a rear end elevation of the machine showing the parts thereof in the same positions as in Figure 1.

The same numerals of reference indicate the same parts in the several figures of the drawings, wherein the ground level on which the machine is traversed when in operation is indicated conventionally by the line denoted by the reference A, while the trench or excavation, which is indicated more or less conventionally in cross section in Figure 3, is denoted by the reference B in the said figure.

Referring first to the embodiment of the invention illustrated by Figures 1 to 4, the traversable standard or framing whereon the bucket operating mechanism is mounted is constituted by four pillars or posts, denoted by the references 15 and 15ª, the said posts being preferably made from suitable lengths of solid drawn metallic tubing.

The said posts 15, 15ª may be interconnected and braced apart in the requisite relationship by spot welding or otherwise securing their ends in or to the respective corners of horizontally disposed rectangular frame-like parts adapted to constitute the head and foot ends of the main frame structure, or as is shown in the drawings their upper ends may be secured to the respective corners of a flat rectangular platelike member 16, while their lower ends are braced apart by bars 17 preferably formed from L or angle bar metal and horizontally disposed adjacent the lower ends of the posts.

The lineal dimensions of the parts whereby the posts 15 and 15ª are interconnected at their upper ends and at or adjacent their lower ends are such that the pillars or posts extending between them diverge laterally relatively to each other in the downward direction, and preferably the relative disposition of the upper and lower interconnecting parts is such that the rearwardly presented pair of pillars 15 while inclining laterally outwards lie in a vertical transverse plane, whereas the forwardly presented pair of pillars 15ª lie in a forwardly inclined transverse plane.

Supplementary bracing rods or bars such as 18 and 19 of tubular or bar metal may be provided intermediate the interconnecting members 16 and 17.

Mounted on the standard described are two lever-like arms, marked respectively 20 and 21, the said arms being fixed to a common shaft 22 adapted to turn in bearings 22ª, 22ᵇ supported on horizontal angle bar members 22ᶜ and 22ᵈ mounted on the standard adjacent its upper end, the bar 22ᶜ being secured to the rear pillars 15 of the standard and the bar 22ᵈ which lies parallel therewith and in the same horizontal plane but at some distance to the rear of the pillars being connected with the standard by bracing rods or struts 23.

The bearings 22ª, 22ᵇ are so disposed on their supporting bars that the axis of the shaft 22 which turns therein lies in or approximately in the middle longitudinal vertical plane of the standard and the lever-like arms 20 and 21 are fixed to the respective ends of the shaft which project from the bearings, the said lever-like arms being so set on the shaft that they project laterally to opposite sides of the shaft and coact to constitute in effect a bell-crank lever the free end of one arm of which lies to one side of the standard and the free end of the other arm to the other side thereof.

The said lever-like arms 20 and 21 are for convenience of reference hereinafter referred to as the operating arm and the bucket sling arm respectively.

The operating arm 20 may be fabricated from a flat metallic plate as shown in Figures 1 to 4 while the bucket sling arm is preferably built up from suitably braced and connected tubular members, or as shown in the modification of the machine represented in Figure 5, hereinafter more particularly referred to, both the lever-like arms may be of tubular metal construction.

The operating arm 20 is fixed on that end of the common shaft 22 which is adjacent to and extends between the rear pillars 15 of the standard and when the said arm is fixed on the shaft the free end thereof projects laterally from between the pillars, the said free end of the arm being furnished with a pulley 20ª over which passes a flexible cable 24 hereinafter more particularly referred to.

The bucket sling arm 21 is fixed on the end of the shaft 22 remote from the standard and the said arm is provided at its free end with means for the connection thereto of a chain 25 from which the scoop or bucket, denoted generally by the reference 26, is slung.

The said connecting means may embody a device such as is shown in the side elevation, Figure 3 of the drawings, and which operates automatically to release the chain 25 from the arm 21 and prevent undesirable strain being put on the machine due to the overloading of the bucket, or from other cause, the said device comprising a bar or link 27 pivoted to a depending part 21ª on the arm 21, and having in pivotal connection therewith a cranked link 27ª to which the chain 25 is suspended by a ring 25ª on its upper end, the said cranked link 27ª being formed at its upper end with a notch with which a pin 27ᵇ carried by a pair of links 27ᶜ pivoted to the upper part of the link 27 is retained in engagement by a strong coil spring 28 so long as the strain on the chain is within a desired or predetermined limit. When the strain on the chain exceeds such limit the notched end of the cranked link 27ª is released from engagement by the pin 27ᵇ and the link 27ª then falls thus permitting the ring 25ª to slide therefrom.

The connection of the lower end of the chain 25 with the bucket may be effected by providing on the rear end of the bucket a cylindrical projection 26ª furnished with flanges 26ᵇ for the location on the projection of a collar or sleeve 25ᵇ to which the chain is attached, and conveniently formed in two strap-like parts which when brought and bolted together embrace and provide a bearing for the projection 26ª on the bucket and wherein the said projection turns when the bucket is being inverted and returned to its normal or non-inverted condition as hereinafter described.

Or other means such for example as are illustrated in Figure 5 and described hereafter in connection with the said figure may be employed for connection of the bucket 26 with the bucket sling arm.

Figure 1:
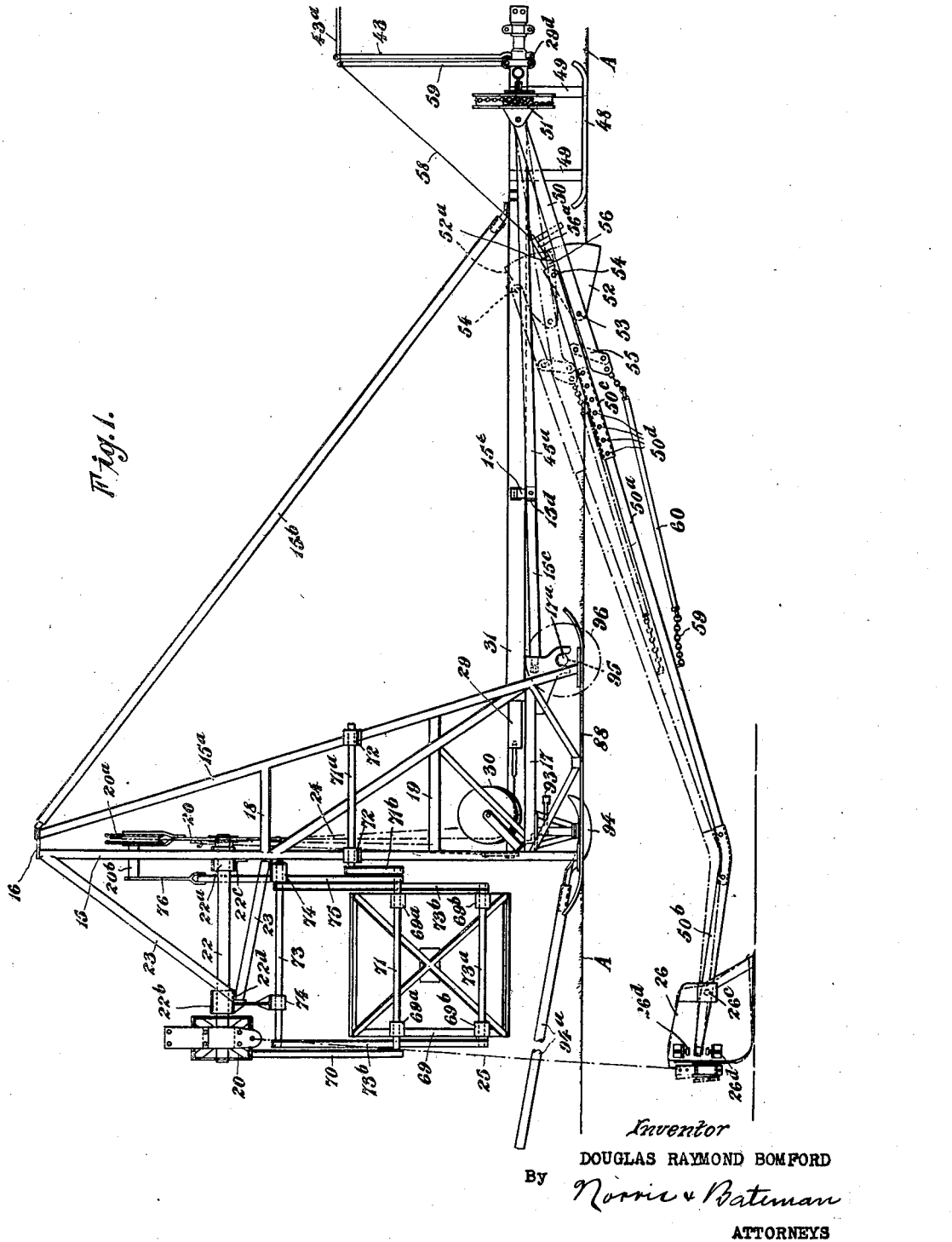
Figure 2:
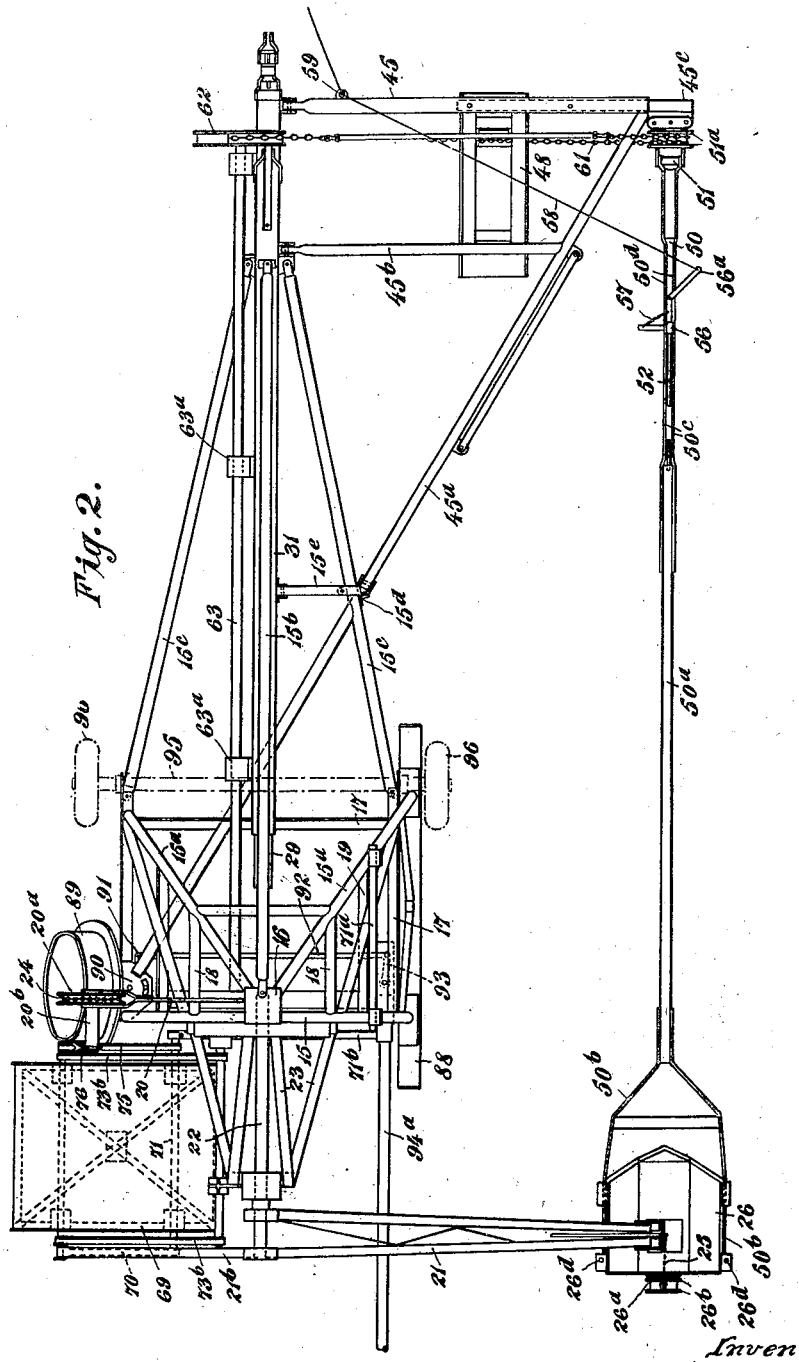
Figure 2 is a plan of the same.

The turning of the bucket sling arm 21 from the more or less horizontal position which it occupies when the bucket is in position for being traversed in the trench, in which position it is shown in Figures 1, 2 and 3, to the more or less vertical position to which it is brought for raising the bucket prior to its inversion for discharging its contents is effected by a downward turning of the operating arm 20 which as aforesaid is mounted on the same shaft as the bucket sling arm.

This downward turning motion of the operating arm is effected by the pull thereon of the aforementioned flexible cable 24 one end of which has an anchorage on the standard of the machine, conveniently on one of the bracing bars 19 thereof, its other end being connected to the rearwardly presented end of the reciprocable member which as hereinbefore stated is incorporated with the draw-bar mechanism provided for connection of the machine with the tractor or motor whereby it is traversed, and which reciprocable member is denoted generally by the reference 29, the said flexible cable 24 passing from its anchorage on the standard over the pulley 20a provided on the outer end of the operating arm 20, and thence passing below a guide or jockey pulley such as 30, or pulleys, so positioned on suitable supporting means on the standard that the cable end is brought into the requisite alignment with the reciprocable member 29 to which it is connected.

The draw-bar mechanism associated with the machine for effecting its connection with the tractor or motor whereby the machine is traversed and which mechanism incorporates the aforesaid reciprocable member which co-operates with the other parts of the machine to effect the desired sequence of operations on the bucket 26, embodies a tubular member wherein the reciprocable member is adapted to slide, and catch mechanism or means whereby, at certain stages in the tractor operation of the machine, the reciprocable member can be so locked or engaged with the tubular member that its sliding motion relative thereto is prevented, while at other stages in the working of the machine the locking engagement between the said member can be released by tripping mechanism under the control of the tractor driver or other attendant on the machine, so that the reciprocable member is permitted to slide in one or other direction independently of and without transmitting motion to the tubular member in which it slides, the machine meanwhile remaining stationary for the performance of certain of its operations.

One convenient construction of these parts of the draw-bar mechanism is represented, detached from the machine, in Figures 6, 7 and 8 which are drawn to a larger scale than the other figures of the drawings.

In the said figures, the tubular member wherein the reciprocable member or component 29 of the draw-bar mechanism is adapted to slide at the requisite stages in the operation of the machine, is denoted by the reference 31 and the said member may be permanently fixed, or is adapted to be securely and preferably detachably fixed, at its rear end to a convenient part of the standard of the machine, such as the front transverse bar of the lower bracing member 17 of the standard so that it extends forwardly in or approximately in the middle longitudinal plane of the machine.

The tubular member 31 is preferably of square or rectangular figure in cross section as shown in the drawings and may be built up from flat metallic strips or plates of the requisite length and width, the adjoining longitudinal edges of the strips or plates being attached by welding, or otherwise attached, to the respective outer faces of longitudinally extending bars 31a of L or angle section and which constitute reinforcements of the interior angles of the tubular member.

The reciprocable member or component 29 of the draw-bar mechanism is constituted by a beam, preferably of steel and having an I or H girder-like figure in cross section, the middle web 29a of the said beam being disposed horizontally in the tubular member 31, the dimensions across the webs being such that the longitudinal edges of the vertically disposed webs 29b fit and slide between the aforesaid L or angle bars 31a provided along the inner corners of the tubular member.

The reciprocable member is or may be furnished with an anti-friction roller 32 adjacent its rear end, that is to say, the end thereof which has operative connection with the mechanism of the machine through the cable 24, the horizontal web 29a of the said member having therein a slot 29c to accommodate the roller which is disposed and rotates in a vertical plane, its periphery contacting with the inner faces of the top and bottom sides of the tubular member.

Anti-friction rollers 33 may also be provided at the front end of the tubular member the said rollers being carried by spindles 34 extending horizontally across the tubular member 31 which is suitably provided with bearings to carry the roller spindles, the front end of the upper and lower sides of the tubular member being cut away to permit the rollers to contact with the upper edges of the vertical webs 29b of the reciprocable member 29.

If desired the provision of the lower roller 33 may be dispensed with.

The tripplable catch or locking means provided to co-act with the members 29 and 31 for the purpose aforesaid embodies a roller 35 which depends, through a slot 31b formed in the top face of the tubular member 31 adjacent the front end thereof, into the channel-like part of the reciprocable member 29 which lies above the horizontally disposed web 29a of the said reciprocable member, the lower part of the periphery of the said roller 35 normally taking a bearing on a strip 36, preferably of steel, which is disposed and capable of sliding on the upper face of the said horizontal web, the slidable strip 36 constituting a part of the tripping means hereinafter more particularly referred to.

The spindle 37 whereon the aforesaid roller 35 depending through the slot 31b in the tubular member is mounted, is carried by a cranked arm, or preferably as shown by a pair of cranked arms 38, mounted and capable of turning on trunnions 39 suitably located on the tubular member, this mounting of the roller spindle permitting the roller to partake of rising and falling motions effected through the medium of the trip gear at the requisite stages in the working of the machine with which the draw-bar mechanism is associated.

A spring is provided to co-act with the pivoted arm or arms which carry the roller spindle 35 for preserving the roller in its normal or fully depressed position in the slot through which it depends in the upper part of the tubular member, the said spring conveniently having the form of a flat or laminated strip metal spring denoted by the reference 40. One end of the said spring is riveted or otherwise fixed to the top side of the tubular member 31 and its other or free end takes a bearing when, as is preferable, the roller spindle is carried by a pair of cranked arms, on a cross spindle extending between and connecting the said arms, or on a sleeve 41 on the said spindle.

When the aforesaid roller 35 occupies its normal or fully depressed position in the upper channel-like part of the reciprocable member 29 it can and will, when the reciprocable member partakes of a sliding motion in one or other direction independently of the tubular member 31 co-act with either the forwardly or rearwardly presented end or face of one or other of a plurality of blocks or stops 42 disposed and fixed cross-wise in the upper part of the channel and at any desired distance apart therein, and such engagement of the roller 35 with one or other of the stops serves so to lock the tubular and reciprocable members together as to arrest further motion of the reciprocable member independently of the tubular member.

The ends of the respective stops 42 which make contact with the roller 35 for effecting the aforesaid locking of the parts are, or may be, curved to the radius of the roller and the opposite ends thereof preferably have the form of an inclined plane up or down which the roller travels when passing over the stops.

The release of the roller 35 from its locking engagement with a stop is effected by tripping means embodying the provision, on the slidable metallic strip 36 hereinbefore referred to disposed on the upper face of the horizontal web of the reciprocable member and whereon the roller 35 normally bears, of wedge-like pieces or blocks 36ª.

One or other of these blocks 36ª, when the strip 36 on which they are carried is moved in one or other direction, so acts on the roller 35 as to raise the same, by the turning of the arms 38 whereon its spindle 37 is mounted, and against the pressure of the spring 40 acting thereon, to such a position relative to the face of the co-acting stop 42 that interaction between the said stop and the roller can effect a sufficient further raising of the roller as to free it from the contacting face of the stop thus permitting the roller to ride over and clear of the stop and the reciprocable member 29 to perform its sliding motion in one or other direction independently of the tubular member 31 wherein it slides.

The sliding motion of the strip 36 which carries the wedge-like blocks 36ª of the tripping means is effected by the connection of one end, preferably as shown the forwardly presented end thereof, to a lever 43 the lower end of which is fulcrumed to a convenient part, such as the projection 29ᵈ provided on the reciprocable member 29, the said lever being adapted to be rocked in a vertical plane through the medium of a cable 43ª, or other connection under the control of the tractor driver or other attendant of the machine, when it is desired to release the roller 35 from locking engagement with a stop 42, the lever 43 and the sliding strip 36 actuated thereby being returned to the normal position when the desired release has been effected through the medium of a coiled spring 44 one end of which is connected to the lever at a suitable point between the ends thereof, its other end having connection with a hook 29ᵉ or other convenient anchorage provided on the reciprocable member 29, the tension which is put on this. spring 44 when the lever is actuated for releasing the catch automatically returning the sliding strip and wedge-like blocks carried thereby to the normal position.

The forwardly presented end of the reciprocable member 29 of the draw-bar mechanism may be adapted for either a flexible or a rigid coupling with the tractor and the rear end thereof is connected as aforesaid with the cable 24.

The number of stops provided on the reciprocable member for coacting with the roller for locking the said member to the tubular member at desired stages in the operation of the machine may be varied according to whether such locking of the parts is desired to be effected only at the extreme inward or outward movement of the reciprocable member relative to the tubular member or at intermediate stages also between the said members.

It will be appreciated that when in the tractor operation of the machine and with the roller 35 occupying its normal or depressed position, the front stop, or an appropriately located intermediate stop, is brought by the forward motion of the tractor into contact with the rear side of the roller, the reciprocable and tubular members of the draw-bar mechanism move together so that the whole machine partakes of the forward motion of the tractor, and that when the roller 35 is released from the engaging stop at the appropriate stage of the forward motion of the tractor the continuing motion of the tractor will effect a forward drawing of the reciprocable member 29 independently of the tubular member 31 thus effecting the requisite operations of the mechanism of the machine which are to be performed while the machine remains stationary. On the completion of these operations the direction of motion of the tractor is reversed to effect or permit the return of the reciprocable member to the position in which the front stop lies adjacent the rear side of the locking roller 35.

The longitudinally extending tubular member 31 wherein the reciprocable component 29 of the draw-bar mechanism is located is rigidly connected with the standard by bracing rods or struts such as are denoted by the references 15ᵇ and 15ᶜ in Figures 1 and 2.

The said longitudinally extending tubular member 31 of the draw-bar mechanism is provided at or adjacent its front end with a laterally projecting tube or bar member 45 of such length and extending in such direction that its end remote from its connection with the longitudinal member lies in the plane which will be traversed by the scoop or bucket 26 when performing its ditch clearing or excavating operations, the said end of the laterally projecting member 45 being connected to the front end of the scoop or bucket by a chain or cable or preferably by the rigid or substantially rigid means hereinafter more particularly described and through which a drag or pull is exerted on the scoop in the forward traverse of the machine, the rigid or substantially rigid connection, where such is provided in lieu of the chain connection, co-acting wtih means, also hereinafter described, for effecting the inversion of the bucket for discharging its contents at the requisite stage in the operation of the machine.

The end of the laterally extending tube or bar member 45 to which the bucket 26 is attached is connected with the standard or, as shown in the plan Figure 2, with one of the bracing rods 15ᶜ of the standard by an inclined tubular stay bar 45ᵃ.

The bucket 26 may be connected to the lateral member 45 of the draw-bar mechanism by a flexible cable or chain, or by rigid or substantially rigid means and in the latter case, as shown in Figures 1 to 3, the said means comprises two rods 50 and 50ᵃ which extend longitudinally between the bucket and the said transverse member 45, and in a plane parallel or substantially parallel with the reciprocable member 29 of the draw-bar mechanism, the outer end of the bar 50 having a universal joint connection 51 with a pulley 51ᵃ, hereinafter more particularly referred to, provided on the said laterally extending member 45, while the outer end of the other bar has pivotal connection with the bucket.

The bars 50, 50ᵃ are of such length that they overlap at their adjoining ends at which ends they are so interconnected by means such as are hereinafter described that while a limited and controlled motion of the one relative to the other is permitted the tractive force which comes on the bar 50 which is connected to the draw-bar mechanism is transmitted to the bar 50ᵃ to which the bucket is attached and further they are adapted to turn as one for the purpose of effecting the inversion of the bucket for discharging the material gathered therein and returning the same to the non-inverted position.

The end of the rigid bar 50ᵃ whereon the bucket is pivotally mounted is constituted by a pair of diverging arms 50ᵇ which are brought parallel at their outer parts so as to lie one on each side of the bucket, the parallel parts having therein holes to constitute bearings for trunnions 26ᶜ provided on the respective sides of the bucket and the extreme ends of the said parallel parts of the arms are located between the presented ends of pairs of screw pins 26ᵈ working in screw boxes provided in lugs on the sides of the bucket, the adjustment of the lower screw pin on each side determining the inclination which the bucket may assume in the operation of the machine and the adjustment of the upper pins maintaining this setting for as long as may be desired.

The end of the bar 50ᵃ opposite to that on which the bucket is pivoted, which end overlaps the bar 50 connected to the transverse member 45 of the draw-bar, or a member 45ᶜ telescopically adjustable therein, is provided with an extension constituted by a pair of parallel spaced apart bars 50ᶜ which form a vertically slotted end for the main part of the bar, and portions of these parallel slot forming bars extend, or may extend, partially along the sides of the main part and be provided with a series of spaced apart holes 50ᵈ adapted to coincide with holes in the end of the main part and serving to permit an adjustable setting of the extension on the main bar.

The bar 50 which co-acts with the bar 50ᵃ and provides the connection between the same and the pulley 51ᵃ aforesaid on the draw-bar mechanism, is formed with a longitudinally slotted portion conveniently obtained by making the said bar from two bars 50ᵈ spaced apart in parallel relationship and as aforesaid the connection between the overlapping ends of the co-acting bars is designed to permit a limited controlled motion of one relative to the other and also ensure their turning as one.

The connection provided between the said overlapping ends of the longitudinally extending co-acting bars 50, 50ᵃ embodies a plate-like member 52 having preferably a substantially triangular or sector-like contour in formation the upper angle or corner at the base thereof being cut away to provide a shouldered part or notch 52ᵃ at this corner, and a similar notch may also be provided at the lower corner.

The plate-like member 52 is disposed in and projects partially above and partially below the slot in the bar 50 and is pivotally connected at its apex to the said bar at a point adjacent the rear end thereof, the pivot being denoted by the reference 53.

The upper part of the said plate-like member 52 projects into the slotted extension at the front or inner end of the bar 50ᵃ whereon the bucket 26 is mounted thus forming a key between the overlapping ends of the two co-acting bars 50, 50ᵃ and the front end of the said bar 50ᵃ is pivotally connected to the plate-like member 52 at a point such as 54 in advance of the pivotal connection 53 of the apex of the said member 52 with the bar 50.

The said co-acting bars 50, 50ᵃ are further coupled to each other at a point rearward of their pivotal connections with the aforesaid key plate 52 by a link 55 the respective ends whereof have a pivotal connection one with each co-acting bar, the distance between the pivotal points of this link being less than the distance between the pivotal connections of the respective bars with the key plate.

It will be appreciated that when a tractive force is applied, in the forward drawing of the machine, to the bar 50 which has the universal joint connection with the draw-bar mechanism, the co-acting bars tend by virtue of their pivotal connections aforesaid with the key plate 52 and link member 55 to partake of movement relative to each other, and in order to prevent such movement while the machine is being traversed for the performance of the cutting or excavating operation of the bucket a pivotally mounted catch 56, preferably in the form of a roller, is provided on the bar 50 to which the apex of the key plate 52 is pivoted, the said catch being under the control of a spring such as 57 and so engaging, during this operation of the parts, with the notch 52ᵃ in the upper corner of the key plate 52 as to prevent the turning motion of the said plate.

The said catch 56 is adapted to be released from this engagement with the key plate 52 through the medium of a cable 58, or other like connection, one end whereof is attached to an operating arm 56ᵃ on the pivoted catch from which it passes by way of suitable guiding means as for example an eye or loop on a vertical rod 59 mounted on the bar 45 to a convenient position for manipulative or pedal operation by the tractor driver or other attendant on the machine.

The release of the catch is effected when the bucket has gathered its full load and is about to be raised and swung laterally and inverted for discharging its contents, the released catch then passing, under the action of the spring 57, and on a partial turning of the key plate 52 on its pivot, into engagement below the lower edge of the key plate, the corner of which may, if desired, be notched, this engagement serving to restrain movement of the co-acting bars back to the normal position relative to each other, during the performance of the raising and turning motions of the bars.

The release of the catch 56 from the said notch

52ᵃ in the key plate 52 permits relative movement between the co-acting longitudinal bars 50, 50ᵃ so that they may assume positions such as are indicated in dotted lines in Figure 1, and the bar 50ᵃ then operates to effect such a tilting of the bucket as will facilitate its front or acting end being drawn clear of the face of the cut preparatory to the raising of the bucket for discharging its contents.

The extent to which the key plate 52 and link connection 55 between the co-acting bars are permitted to turn on the release of the catch 56 is determined by a flexible cable or chain 59 the ends of which are connected respectively to the co-acting bars, the said cable or chain being normally slack but becoming taut when relative motion occurs between the co-acting bars and when taut also serving to take up the tension of the forward draught.

Provision may be made for adjusting the length of the said flexible cable or chain according to the depth to which the bucket is to perform the clearing or excavating operation, convenient adjusting means being afforded by the employment of a tubular rod such as 60 as a component part of the chain or cable connection between the bars, one or both ends of the said rod being furnished with an eye bolt having a screwed shank for screwing to any desired extent into the tapped end, or tapped ends, of the rod.

When the bucket, after being raised and inverted, is returned to the non-inverted position and again lowered to the ground or operating level the operator releases the catch 56 from below the lower edge of the key plate, or the notch therein where a notch is provided, and the catch then flies back under the action of its spring into the notch 52ᵃ; or the release action may come automatically into effect on impact of the bucket with the ground when it is lowered to make the succeeding clearing or excavating operation.

The raising of the bucket and movement of the same laterally to the position at which it is inverted for discharging its contents either directly on to the ground to one side of the excavation of trench B, or on to a side delivery plate or tray such as is hereinafter described, and which is preferably provided in combination with the machine, is effected through the medium of the flexible cable or chain 25 which depends from the bucket sling arm 21 and has connection with the rear end of the bucket as hereinbefore described.

For effecting the inversion of the bucket 26 when it is brought to the raised position and its return to the non-inverted position a partial rotative motion in the requisite direction is given to the co-acting bars 50, 50ᵃ whereon the bucket is mounted such motion being communicated to the said bars through the aforesaid connection of the front or outer end of the bar 50 to the pulley 51ᵃ and which pulley is adapted to be partially rotated for this purpose and at the appropriate stages in the sequence of operations of the machine through a chain or cable 61 which is passed around the periphery of the pulley, to which it may be pinned to prevent slip, and which extends transversely across the machine parallel with the lateral member 45 of the draw-bar mechanism, the ends of the upper and lower parts of the said chain or cable passing respectively over and under the periphery of a pulley 62 and being anchored thereto.

The pulley 62 is mounted on and turns with a shaft 63 which extends longitudinally of the machine, the said shaft being disposed adjacent to and in a plane parallel with the reciprocable draw-bar member 29 and being supported in bearings 63ᵃ provided on the tubular member 31 wherein the said reciprocable member is located.

The rearwardly presented end of the shaft 63 terminates in or approximately in the vertical transverse plane in which the operating arm 20 of the machine is located and the shaft is furnished at this end with a double armed lever-like member the arms whereof are denoted by the references 64 and 64ᵃ and by the rocking of which the shaft 63 can be turned in one or other direction.

The rocking of the double armed lever 64, 64ᵃ at the appropriate times in the operation of the machine may be effected by the connection of the arm 64 by a chain or cable 65, preferably embodying an adjustment link or rod 65ᵃ, with a radially directed arm 66 fixed on the shaft 22 in close proximity to the operating arm 20, and of the arm 64ᵃ by the chain or cable 67, also preferably embodying an adjustment rod 67ᵃ, to a second radially directed arm suitably disposed on the said shaft 22, but the provision of such second arm may be dispensed with and the requisite operation of the chain or cable 67 be effected by connecting its upper end, at an appropriate point, such as 68, with the operating arm 20, as shown in Figure 3.

When the bucket sling arm 21 is in the lowered position the arm 66 depends downwardly and the arm 64 with which it is connected through the chain 65 also depends downwardly in this condition of the parts. The chain 65 which interconnects the arm 66 with the lever arm 64 is a slack chain its slackness being sufficient to provide a lost motion between the turning of the bucket sling arm 21 and the double armed lever 64, 64ᵃ while the bucket sling arm is moving upwardly and inwardly until it approaches the position at which the bucket is to be inverted, when the chain 65 becomes taut and thereafter effects the upward turning of the double armed lever and therethrough the turning of the longitudinal shaft 63 and parts operated thereby in the requisite direction for inverting the bucket.

The chain 67 connecting the arm 64ᵃ of the double armed lever with the operating arm 20, or to a similar lever to 66, as may be provided, operates to effect the requisite movement of the said double-armed lever, and therethrough the shaft 63, in the direction proper for returning the bucket to the non-inverted position, and this chain connection is preferably a taut connection so that it serves to exercise a steadying effect on the motions of the parts in either direction.

When the bucket is inverted for discharging its contents the material gathered therein may be allowed to fall directly to the ground at the side of the ditch or excavation, but preferably and in order that the said material shall be deposited at a greater distance from the side of the ditch than if allowed to drop direct on the ground, there is provided in combination with the machine a tray-like member, hereinafter referred to as the side delivery tray, on to which the material from the inverted bucket falls and by the operation of which it is subsequently dropped to the ground well clear of the machine at the side thereof remote from the ditch or excavation, the means or mechanism provided for effecting the requisite motions of the said side delivery tray being operable through the medium of the bucket sling arm so that they synchronise with the other motions of the machine.

A convenient embodiment of side delivery tray and its operating mechanism is shown in connection with the machine illustrated in Figures 1 to 4, of the drawings, the parts thereof being represented in Figures 1 to 3, in the relative positions to which they are brought for the dropping from the tray of the material received thereon from the bucket, and in Figure 4 in the relative positions which they assume when the tray is brought to the requisite location for receiving the material dropped from the inverted bucket, which is not shown in the said figure, certain other parts of the machine being also omitted from this figure for the sake of clarity.

As will be seen from the drawings the side delivery tray, which is denoted by the reference 69 is so mounted at the rear of the standard of the machine as to occupy, when the bucket sling arm 21 is turned downwardly to bring the bucket into its acting position, a raised and downwardly inclined position at the side of the machine which is remote from the side thereof adjacent the ditch or trench which is being excavated or cleared, and it is supported in this position and connected to the framing of the machine by members which have a pivotal connection with the said framing, one of the said pivotal members also having a pivotal connection with the lower end of a link or connecting rod 70 depending from and having a pivotal connection at its upper end with the outer end of an extension 21ᵇ provided on the bucket sling arm and projecting from the opposite side of the machine to that from which the bucket sling arm projects, the said extension 21ᵃ partaking of the turning motions of the bucket sling arm.

The side delivery tray supporting members are preferably formed from lengths of metallic tube or rod and bar metal and the member to which the lower end of the link 70 depending from the extension 21ᵇ of the bucket sling arm 21 is pivotally connected is so formed as to provide two horizontally disposed arms or branches denoted respectively by the references 71 and 71ᵃ, and which are interconnected by a cranked portion 71ᵇ.

The horizontal arms or branches 71, 71ᵃ are of cylindrical formation and the interconnecting or cranked part 71ᵇ is of angle iron, but it may be cylindrical and formed integral with the horizontal branches.

The horizontally disposed arm or branch 71 of this supporting member is adapted to extend across the underside of the side delivery tray 69 which is provided with bearings 69ᵃ for the said arm or branch, the said bearings being disposed on the underside of the tray adjacent the end thereof contiguous to the frame of the machine. The second horizontally disposed arm or branch 71ᵃ extends across the side of the machine frame or standard remote from the tray and has pivotal connection at the said side in sockets or bearings 72 provided at a suitable height on the tubular members 15 and 15ᵃ of the framing, and the cranked portion 71ᵇ of the said member which interconnects the horizontally disposed arms or branches extends across the rear side of the machine standard.

The other member provided for supporting the side delivery tray 69 is preferably of a rectangular frame-like formation and embodies upper and lower horizontally disposed members conveniently formed from cylindrical tube or rod and denoted respectively by the references 73 and 73ᵃ which are interconnected by side members 73ᵇ conveniently formed from angle iron; or the said frame-like member may be made from a suitably bent single length of cylindrical rod or tubing.

The lower side 73ᵃ of the said frame-like member is adapted to extend horizontally below and across the tray 69 and has a pivotal connection therewith in bearings 69ᵇ disposed at a point adjacent the side of the tray which when the tray occupies its raised and inclined position is lowermost and remote from the frame or standard of the machine.

Tht upper side 73 of the rectangular frame-like member is pivoted in bearings such as 74 carried by brackets mounted on convenient parts of the framing contiguous to the tray and in a plane above that in which the horizontal branch 71ᵃ of the other tray supporting member is pivoted to the other side of the framing or standard.

The length of the sides 73ᵇ of this rectangular frame-like tray supporting member in relation to the length of the cranked intermediate portion 71ᵇ of the other supporting member, and the points of pivotal attachment respectively of the said members to the frame or standard of the machine are such that when these members turn downwardly about their pivotal connections so that the frame-like member and the cranked intermediate part 71ᵇ of the other member are brought to a vertical or substantially vertical position, the side delivery tray 69 is brought into a horizontal position at or more or less at ground level as shown in Figure 4 and in this position is adapted to receive the material which is discharged from the bucket or scoop.

The bringing of the side delivery tray 69 into this position is effected automatically when in the operation of the machine the bucket sling arm 21 is turned upwardly to raise the bucket to the position at which it is inverted to discharge its contents, this upward turning of the said arm effecting the downward turning of its extension 21ᵇ and the link 70 which depends therefrom and is in operative connection with the branch 71 of the cranked supporting member of the side delivery tray.

When the bucket sling arm 21 is again turned downwardly the consequent upward motion of the extension thereof 21ᵇ raises the side delivery tray and brings it to the inclined position and the material which has been deposited thereon from the bucket drops from its lower end and well clear of the machine.

If desired, and as shown in the drawings, the branch 71 of the cranked member supporting the side delivery tray 69, may in addition to its connection through the link or connecting rod 70 with the extension 21ᵇ on the bucket sling arm, also be connected through a connecting rod 75 and link 76 with an extension 20ᵇ of the spindle whereon the pulley 20ᵃ is mounted on the operating arm 20.

Portions of the side of the tray may be provided with upstanding walls to restrain the material from falling therefrom excepting at the side which is remote from the standard when the tray is brought to the raised and inclined position.

Briefly the parts of the machine thus far described co-act as follows in the operation of the machine:

When a tractive force is applied to the machine for drawing it to the location at which it is to be employed the reciprocable member 29 will be drawn forwardly in the tubular member 31 and the roller 35 of the trippable catch will co-act with a rearward stop 42 to lock the reciprocable member to the tubular member and thereby transmit the tractive force to the said tubular member for effecting therethrough the traverse of the machine.

In this condition of the parts the action of the reciprocable member on the operating arm 20 will have effected the drawing down of the said arm and consequent upward turning of the bucket sling arm 21 and the movement of the side delivery tray 69 into the horizontal position in which it is seen in Figure 4.

When the machine has been brought to the location at which it is to commence its operations the tractor by which it is drawn is put into reverse and moved backwardly to slacken its connection with the front end of the reciprocable member 29 and the operator releases the catch 35 by appropriate actuation of the cable 43ª in connection with the trip lever 43.

This release of the reciprocable member permits it to move rearwardly thereby slackening the cable 24 connected to its rear end, but this slack is taken up by the upward turning motion of the operating arm 20 on the pulley 20ª over which the cable passes, which motion is automatically effected by the descent under the action of gravity of the bucket sling arm 21 to the ground level or position for the performance of its cutting or scooping operation.

Meanwhile the trippable catch has been allowed to drop into engagement with the front notch 42 in the reciprocable member thus locking the said member with the fixed tubular member of the draw-bar mechanism and when the tractor next moves forward the machine is drawn thereby during the performance of scooping or cutting operation on the ditch.

When the bucket has gathered its load the operator again actuates the tripping mechanism described to release the catch 35 from the front stop 42 and the tractor then continues its forward motion without drawing the standard of the machine from the position at which it has arrived at the end of the scooping or cutting operation and while the standard remains stationary the reciprocable member 29 is by the continued motion of the tractor drawn forwardly to the extent necessary for turning the operating arm downwardly so as to raise the bucket sling arm to the position at which the mechanism hereinbefore described for effecting the inversion of the bucket comes into operation and the contents of the bucket are discharged onto the side delivery tray 69 which has been brought automatically into the horizontal position ready to receive the material dropped from the bucket.

The tractor is then put into reverse so as again to slacken its connection with the reciprocable bar member 29, the bucket is returned to the non-inverted position, and descends to the level for making a fresh cut and the sequence of operations is repeated.

Figure 5 of the drawings illustrates a modification in the construction of the mechanism according to which the connection between the bucket 26 and the transverse member 45 of the draw-bar mechanism is constituted by a flexible cable or drag chain, denoted by the reference 77, and when such flexible connection is provided the suspension of the bucket from the bucket sling arm 21 and the inversion of the bucket at the requisite stage in the operations of the machine may be effected by the means hereinafter described.

The free end of the bucket sling arm is furnished with a transversely disposed spindle 78 which carries two pulleys denoted respectively by the references 79 and 80.

Suspended from the pulley 80 is an endless chain 81 which constitutes a sling for the bucket 26 the lower part of the said chain passing around a drum 26$^f$ provided on the rear side of the bucket and which may be of the same diameter as the pulley 80 over which the upper end of the chain passes.

The endless sling chain is prevented from travelling relative to the pulley 80 and drum 26$^f$ over and under which its respective ends are passed by pinning or otherwise fixing the chain to the said pulley and drum, the fixture to the pulley being effected at the tangential point denoted by 81ª at which the straight part of the chain remote from the standard leaves the pulley, and the fixture to the drum 26$^f$ being made at the point 81$^b$ or thereabouts, at which the other straight length of the chain leaves the drum to pass upwardly to the pulley 80 on the bucket sling arm.

The second pulley 79 is of smaller diameter than the pulley 80, the said smaller pulley having in connection therewith a flexible cable or chain 82 one end of which is fixed to the periphery of the pulley and its other end to a suitable point such as 83 on an arm or bracket 84 carried by the standard of the machine, the said chain 82 in passing to its conection with the standard embracing at least one half of the periphery of the pulley 79 to which it is attached.

This chain is of such length that it remains slack between its points of connection with the pulley 79 and standard connection 83 until the bucket sling arm 21 is, in the operation of the machine as hereinafter described, closely approximating its fully raised position in which it is shown in dotted lines in the figures when the chain then becomes taut, and during the completion of the upward motion of the arm the said chain effects the semi-rotation of the small pulley 79 and also the semi-rotation of the larger pulley 80 fixed on the same spindle, and by reason of the connection hereinbefore referred to of this pulley with the cling chain 81 and the sling chain connection with the drum 26$^f$ on the bucket 26 the said bucket is turned into an inverted position to discharge the refuse or soil which has been gathered or cut from the trench either direct to the ground or on to a side delivery tray, such as hereinbefore described and represented in Figures 1, 2 and 3.

The straight portion of the sling chain 81 which is remote from the standard is adapted for the attachment thereto of a weight 85 which at the appropriate stage in the operation of the machine serves to bring the bucket into the non-inverted position and to assist in bringing the bucket sling arm back to its lowermost position.

The pulley 80 is provided with suitably positioned stops (not shown) which co-act with the bucket sling arm 21 to prevent the pulley turning beyond 180 degrees or thereabouts in either direction of its motions.

As in the first described arrangement the turning of the bucket sling arm 21 into its raised position for discharging the contents of the bucket is effected by a downward turning motion of the operating arm 20 mounted on the same shaft 22.

Where, as in this modification a flexible cable or chain connection of the bucket with the draw-bar mechanism is provided, a certain measure of control of the bucket by an attendant on the machine is required during its operation, and for this purpose the rear end of the bucket is furnished with an operating handle denoted by the reference 86 in the more or less diagrammatic view of the bucket shown in Figure 10.

This operating handle may be constituted by a tubular metallic shaft provided at the end to be gripped by the operator with cross-wise disposed projections 86ª for gripping by the operator, which projections are shown vertical in the figure, but would normally be brought in use and by the turning of the shaft on its connection with the bucket into a more or less horizontal plane.

The means provided for the attachment of the handle to the bucket may be constituted by a short rod or tube 87 onto or into which the connected end of the shaft 86 fits spigot-wise and in order to permit an adjustable setting of the inclination of the handle to meet varying requirements the member 87 has a pivotal and angularly adjustable connection with the bucket, such connection being conveniently made by the provision in the drum 26$^f$ of a vertically and diametrically disposed plate 26$^g$ to which the inner end of the member 87, which end is bifurcated to pass on to the plate, is pivoted as at 87ª, the branches of the bifurcated end having therein coincident holes adapted to be brought into coincidence with one or other of a series of arcuately disposed holes 26$^h$ in the plate 26$^g$, the member 87 being then fixed in the adjusted position by a bolt passed through the coincident holes.

In order to obviate the liability to twisting or jar on the wrists of the operator when the bucket is being inverted for discharging its contents, the handle may be fitted at the end which is gripped with a short solid or tubular cylindrical extensions 86$^b$ so attached thereto as to permit rotation of the main part 86 with which it is in axial alignment, relative thereto, the operator transferring his grip from the crosswise parts 86ª to this rotatable extension 86$^b$ when the bucket is about to be inverted.

According to a modified construction of the co-operating reciprocable and fixed members 29 and 31 associated with the draw-bar mechanism, the reciprocable member may, as is illustrated in Figure 9, be constituted by a plain tubular rod fitting in the fixed rod and reciprocable relative thereto through the connection of the rear and front ends, as in the first described arrangement, with the cable 24 and tractor respectively.

The said reciprocable member 29 is provided in its upper side with two notches 29$^f$, 29$^g$ which may be disposed towards the rearward part thereof as shown, or if desired towards the forward part, and with one or other of which a pin 35ª working through a slot 31$^c$ provided in the tubular member 31 is adapted to engage according to the position to which the reciprocable member is moved, and required to be locked, in relation to the tubular member in the sequential operations of the parts of the machine. The locking pin 35ª which is retained in its locking position by a spring 43ª is carried by a lever such as 43$^b$ pivoted in an appropriate position on the tubular member 31 and operable for withdrawing it from a locking position through the medium of a cable 43$^c$ under the control of the tractor driver or other attendant on the machine.

In this modified construction the parts described perform like functions, in the sequential operations of the machine, to the corresponding parts of the first described arrangement.

To economise space in the storage of the machine, or when the machine is being traversed from one locality to another, the transverse members 45 and 45$^b$ of the draw-bar mechanism may, as indicated in the drawings, have a pivotal connection with the longitudinal tubular member 31 so as to be capable of being turned into a substantially vertical plane, the said bars when upwardly turned carrying therewith certain of the parts connected thereto, and where such provision is made the inclined stay 45ª is not attached to the bracing bar 15$^c$ but takes against an abutment 15$^d$ thereon with which it is held in engagement, when in the horizontal position, by the overhanging end of a bar 15$^e$ the other end of which is pivoted to the member 31, the said bar 15$^e$ being turned from its overhanging engagement with the end of the member 45ª when the parts are to be brought to the upwardly turned position.

The lower end of the standard of the machines described may be furnished at both sides with skids of bar metal whereon the machine travels when in operation and if desired the skid on the side of the standard remote from the ditch may be provided with a detachable bar member set edgewise against the outer edge of the skid and the lower edge of which projects somewhat below the under face of the skid, the said lower edge cutting into the ground in the traversing motion of the standard and operating to check the tendency to deflection of the standard from motion in the desired direction due to the drag which may be imposed on the machine from the resistance offered to the forward motion of the bucket in the performance of its clearing or cutting operation.

Or as is represented in the drawings one skid only, denoted by the reference 88, may be provided at the lower end of the standard, the said skid being disposed at the side adjacent the trench, the lower end of the standard at the side remote from the trench being supported at the rear corner by a flanged wheel 89 the axle of which is so inclined that the wheel acts to resist the lateral thrust set up in the operation of the machine.

In order to provide for the steering of the machine when the trench to be cleared or excavated deviates from a straight path the inclined axle of the flanged wheel 89 may be carried on the standard of the machine by a turn-table-like member 90 in operative connection through an arm 91 which is coupled by a transversely disposed rod 92, analogous to the track rod of motor vehicle steering gear, with an arm 93 on a vertical post which may be mounted on the skid plate 88, or as shown in the drawings on a base suitably supported from the standard, the base of the post carrying a rudder-like device 94 operable through a tiller-like handle 94ª extending rearwardly of the machine.

The rudder-like device 94 is of T shape or cross section the vertical web thereof cutting into the ground and it will be appreciated that any deflection which may be given to the rudder for the steering of the machine when operating on a trench which deviates from a straight path will be transmitted to the wheel 89 so that it co-acts with the rudder in the steering operation.

As an adjunct to machines in accordance with the invention described, an axle, furnished at its respective ends with a rubber tyred or other suitable wheel, may be provided for use when the machine is being traversed over roads or when otherwise desirable, the said axle being adapted to be readily positioned transversely across the lower or base part of the standard as is indicated in dot and dash lines in Figures 1 and 2 wherein the axle and wheels carried thereby are denoted by the references 95 and 96 respectively.

This axle has no actual attachment to the base members of the standard but it may effectively be retained in the desired position relative to the lower part of the standard by providing on the said lower part, and preferably at the forwardly presented corners thereof, bracket-like extensions having therein slots 17a open on their lower sides to permit them to pass on to and rest saddle-wise on the axle adjacent its respective ends, and lateral displacement of the axle may be prevented by the provision thereon of collars or other suitable means co-acting with one or other side of the slotted extensions for the said purpose.

The machinery described and the parts of which are susceptible of variation in details of construction, is more especially designed or intended for use in the clearing of existing field ditches from silt and other material or refuse with which they are liable to become clogged but it may also be utilized for the excavation of new ditches if desired.

I claim:

1. In a machine for clearing or excavating ditches, the combination of a traversable standard, a bucket to remove material from the ditch, means carried by the standard for raising and lowering the bucket, means carried by the standard for inverting the bucket, draw bar mechanism for effecting traversing movement of the standard comprising a member fixed to the standard and a movable member connected to the bucket raising and lowering and inverting means and adapted to be drawn by a tractor, and means for holding said movable member in fixed relation to the fixed member to effect traversing movement of the standard and operable to release said movable member to permit it to operate said bucket lifting and lowering and inverting means.

2. A machine according to claim 1, wherein said bucket inverting means is connected to and operated by said bucket lifting and lowering means.

3. In a machine for clearing or excavating ditches, the combination of a traversable standard, a bucket to remove material from the ditch, means carried by the standard for raising and lowering the bucket, means carried by the standard for inverting the bucket, a tray mounted to swing laterally on the standard to receive material from the inverted bucket and having means for operating it from the bucket lifting and lowering means, draw bar mechanism for effecting traversing movement of the standard comprising a member fixed to the standard and a movable member connected to the bucket raising and lowering and inverting means and adapted to be drawn by a tractor, and means for holding said movable member in fixed relation to the fixed member to effect traversing movement of the standard and operable to release said movable member to permit it to operate said bucket raising and lowering and inverting means.

4. A machine according to claim 3, wherein said tray is so mounted as to occupy a substantially horizontal material receiving position when swung in one direction, and to occupy an inclined material discharging position when swung in an opposite direction.

5. In a machine for clearing or excavating ditches, a traversable standard, mechanism mounted thereon for operating a scoop or bucket to clear or excavate material from the ditch, to lower the said bucket to its operative position and raise and impart a lateral motion thereto, and to invert the scoop or bucket to discharge its contents, draw bar mechanism including a reciprocable member one end of which is operatively connected to said mechanism and the other end of which is adapted to be connected to a tractor or motor for effecting the traversing of the machine, and a trippable catch device controlling said reciprocable member whereby its motion relatively to a fixed part of the draw bar mechanism may be permitted or arrested at appropriate stages in the operation of the machine.

6. In a machine for clearing or excavating ditches, the combination of a traversable standard, a scoop-like bucket for gathering and removing material from the ditch, mechanism mounted on the standard and cooperating with the bucket to perform in sequence the operations of drawing the bucket along the ditch, lifting the bucket, and inverting the bucket, and draw bar mechanism including a longitudinally reciprocable member adapted for connection with a tractor or motor whereby the machine is traversed and connected to said bucket operating mechanism for performing said sequence of operations on the bucket, and a trippable catch for locking and unlocking said reciprocable member whereby the operation of said member is controllable at will.

7. In a machine for clearing or excavating ditches, the combination of a traversable standard, a scoop-like bucket for gathering and removing material from the ditch, mechanism mounted on the standard and cooperating with the bucket to perform in sequence the operations of drawing the bucket along the ditch, lifting the bucket, and inverting the bucket, and draw bar mechanism including a longitudinally reciprocable member adapted for connection with a tractor or motor whereby the machine is traversed and connected to said bucket operating mechanism for performing said sequence of operations on the bucket, a tubular member fixed to said standard, and a catch trippable at will for locking and unlocking said reciprocable member and thereby control the performance of said operations.

8. In a machine for clearing or excavating ditches, the combination of a traversable standard, a bucket for removing material from the ditch, means for tractively connecting the bucket to said standard, a bucket sling arm and an operating arm pivoted on the standard for rotation synchronously, flexible means suspending the bucket from said sling arm for raising and lowering thereof, flexible operating means connected to said operating arm, draw bar mechanism including a draft member for effecting the traversing of the machine, said draft member being reciprocatory relatively to said standard and connected to said flexible operating means for actuating the latter, and means operative to invert the bucket during rotation of said sling arm to lift the bucket.

9. A machine according to claim 8, wherein said means for tractively connecting the bucket to said standard comprises coacting rigid bar members which overlap at adjacent ends, one of said bar members being connected to the bucket and the other of said bar members being connected to said standard, and means including a link and a catch-controlled plate pivotally connecting said bar members for controlling the angular position of the bar member connected to the bucket.

10. A machine according to claim 8, wherein said means to invert the bucket comprises a pulley having a universal joint connection with said means for tractively connecting the bucket to said standard, and means operative to rotate said pulley to invert the bucket and return it to non-inverted position during rotation of said sling arm to raise and lower the bucket.

11. A machine according to claim 8, wherein said means to invert the bucket comprises a pulley having a universal joint connection with said means for tractively connecting the bucket to said standard, and means operative to rotate said pulley to invert the bucket and return it to non-inverted position during rotation of said sling arm to raise and lower the bucket comprising a flexible member wound on said pulley, a cooperating pulley connected to said flexible member, a shaft on which said cooperating pulley is carried, a double armed lever fixed to said shaft, and connections between the ends of said lever and said operating arm at opposite sides respectively of said shaft.

12. A machine according to claim 8, wherein said flexible means suspending the bucket from said sling arm is of looped form and is connected at its lower end to the bucket, and said means to invert the bucket comprises a pulley mounted at the end of said bucket sling arm and with which the upper looped portion of said flexible means suspending the bucket cooperates, and means connected to said pulley and operative to impart a partial rotation thereto to invert the bucket during rotation of said sling arm.

13. In a machine of the class described, the combination of a standard, a bucket sling arm pivotally mounted thereon, a bucket suspended from said sling arm to be raised and lowered thereby, means for inverting the bucket to discharge material therefrom while the bucket is raised, and a tray having means operative in timed relation with the sling arm to bring it into an approximately horizontal position to receive material from the bucket when the latter is inverted, and for subsequently swinging it into an inclined position to discharge material therefrom.

14. A machine according to claim 13, wherein said tray is supported by pivoted swinging links of such relative lengths and pivot point locations as to bring it into said positions.

DOUGLAS RAYMOND BOMFORD.